Figure 1:
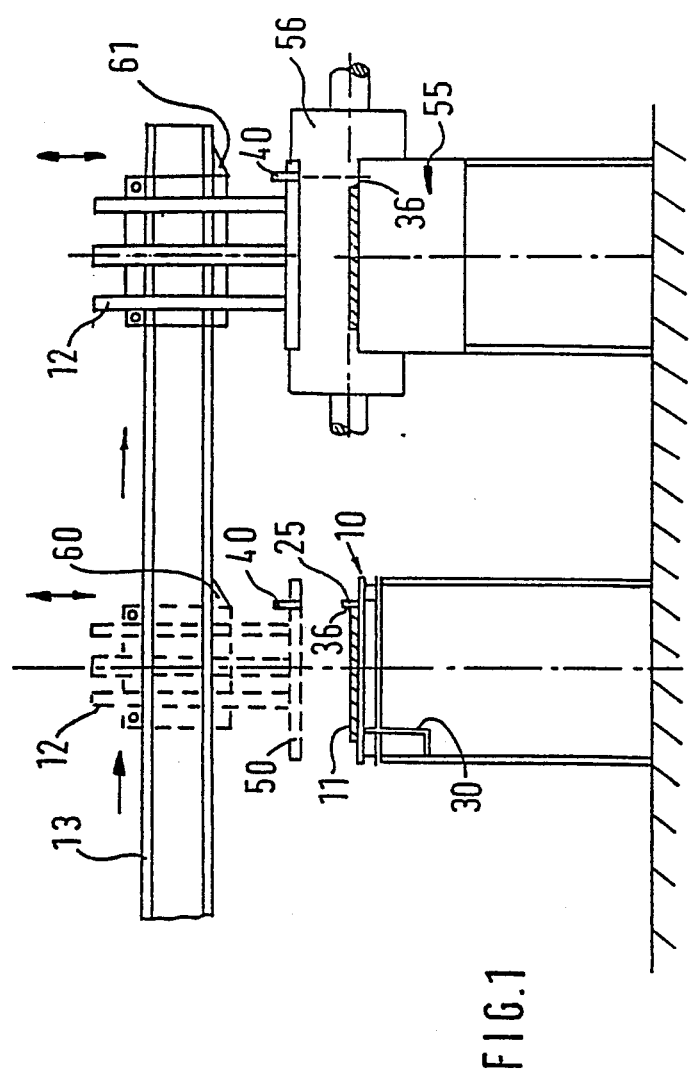

United States Patent [19]
Goodfellow

[11] Patent Number: 4,749,424
[45] Date of Patent: Jun. 7, 1988

[54] METHODS AND APPARATUS FOR THE MANUFACTURE OF PNEUMATIC TIRES

[75] Inventor: Anthony G. Goodfellow, Maghull, United Kingdom

[73] Assignee: W & A Bates Limited a British Company, United Kingdom

[21] Appl. No.: 900,274

[22] Filed: Aug. 27, 1986

Related U.S. Application Data

[63] Continuation of Ser. No. 697,151, Feb. 1, 1985, abandoned.

[30] Foreign Application Priority Data

Feb. 10, 1984 [GB] United Kingdom ............... 8403495

[51] Int. Cl.⁴ .............................................. B29D 30/24
[52] U.S. Cl. ................................. 156/130; 156/405.1; 156/414
[58] Field of Search ............... 156/110.1, 128.1, 128.6, 156/130, 129, 130.3, 130.7, 133, 134, 360, 405.1, 406.4, 414, 416, 394.1, 417–420

[56] References Cited

U.S. PATENT DOCUMENTS

| | | | |
|---|---|---|---|
| 3,397,099 | 8/1968 | Barefoot | 156/130 |
| 3,728,181 | 4/1973 | Simmons | 156/130 |
| 3,874,974 | 4/1975 | Simmons | 156/130 |
| 3,892,616 | 7/1975 | Crites | 156/352 |
| 4,151,035 | 4/1979 | Jellison | 156/133 |
| 4,359,675 | 11/1982 | Miller | 318/603 |
| 4,474,338 | 10/1984 | Hirano et al. | 156/405.1 |

FOREIGN PATENT DOCUMENTS 0091542 10/1983 European Pat. Off. ............ 156/414

Primary Examiner—Donald E. Czaja
Assistant Examiner—Ramon R. Hoch
Attorney, Agent, or Firm—Stevens, Davis, Miller & Mosher

[57] ABSTRACT

In the feeding of a strip of tire building material to a former, it is desirable to achieve a butt-joint between the ends of the strip when it has been wrapped fully around the circumference of the former (which may already have some material which has been wrapped around its surface in a previous operation). As the strip is fed to the former, its length is measured and the diameter of the former is adjusted if necessary to match the circumference of the former (and any existing material thereon) to the length of the strip.

4 Claims, 2 Drawing Sheets

METHODS AND APPARATUS FOR THE MANUFACTURE OF PNEUMATIC TIRES

This application is a continuation of application Ser. No. 697,151, filed Feb. 1, 1985, now abandoned.

This invention relates to methods and apparatus for the manufacture of pneumatic tire, and particularly for the building of a tire from components formed from strips of material which are wrapped around a former.

In wrapping a strip of material around a former to form part of a pneumatic tire being built on the former, or to form an annular component to be subsequently transferred to a tire building former, problems arise in achieving an abutting relationship of the ends of the strip. If the length of the strip and the circumference of the former (and of any material already on the former) do not match, a thick joint or gap may be produced at the ends of the strip.

In known methods of tire building, accurate control of the length of the strip has been attempted, but such methods have not proved to be entirely satisfactory in the use of automatic machinery.

One object of the invention is to provide a method of feeding a strip of material to a former so as to achieve a good joining relationship of the ends of the strip after it has been wrapped around the former.

According to one aspect of the invention, a method of feeding a strip of tire building material to a former so as to achieve a good joining relationship of the ends of the strip after it has been wrapped around the former comprises accurately measuring the length of the strip and controlling the diameter of the former to match the circumference of the former and any material carried thereon to the length of the strip.

According to another aspect of the invention, apparatus for forming an annular tire component comprises means for feeding a strip of tire building material to a former, means for measuring the length of the strip, and means responsive to said measuring means to control the diameter of the former so as to match the circumference of the former and any material carried thereon to the length of the strip.

Figure 2:
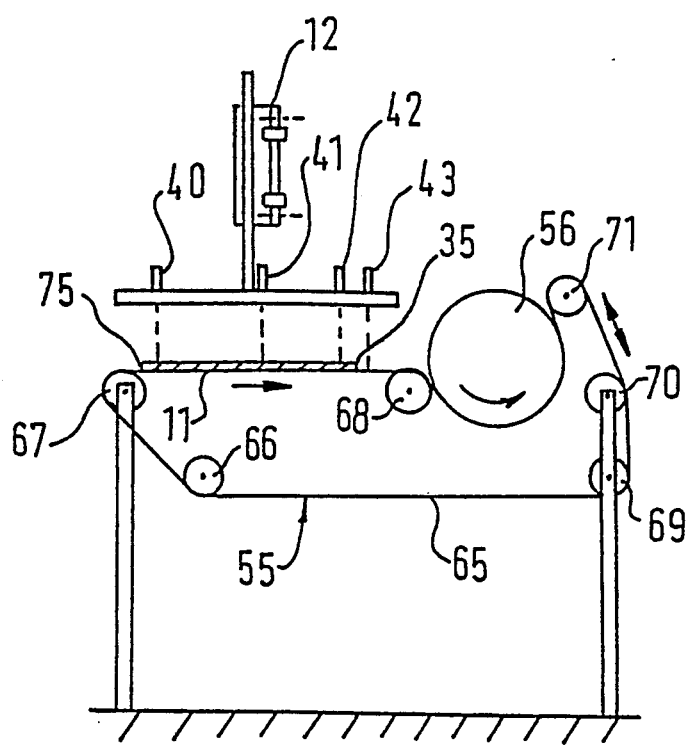

One embodiment of the invention will now be described, by way of example, with reference to the accompanying drawings in which:

FIG. 1 is a front elevation showing apparatus for feeding a ply of tire building fabric to a tire building former: and FIG. 2 is a side view of the apparatus shown in FIG. 1.

The apparatus shown in FIGS. 1 and 2 is described in greater detail in the Description of the assignee's co-pending U.S. Pat. No. 697,243 filed Feb. 1, 1985 (reference WAB 1009). The apparatus comprises a floatation table 10 on which a ply 11 is placed by a vacuum operated gripping device 12 which is movable along an overhead track 13 to transfer the ply from a temporary storage tray (not shown) to the floatation table. The cords of the ply (for a radial tire) are roughly aligned parallel with the shorter side of the table 10, i.e. parallel to the plane of the paper in FIG. 1.

By tilting of the table 10, the ply is arranged with its right hand edge as seen in FIG. 1 in line with a datum line defined by spring loaded pegs, one of which is indicated in FIG. 1 (item 25). The ply is then moved by means of a shoe 50 forming part of the gripping device 12 to a conveyor 55, the movement of the gripping device 12 being accurately determined by adjustable abutments 60 and 61. The position of the ply on the conveyor then bears a predetermined relationship to its aligned position on the table 10 and this arrangement ensures that the play can be fed by the conveyor 55 in correct alignment to a tire building former 56 which is arranged adjacent the conveyor 55.

Movement of the conveyor 55 to transfer the ply 11 to the tire building former 56 is carried out by a conventional drive mechanism (not shown) for an endless belt 65 which passes around fixed rollers 66, 67, 68, 69, 70 and a movable roller 71 which can tighten the belt in lapping relationship with the former 56 as shown in FIG. 2 and which can be lowered to release the belt from the former to enable the former to be withdrawn from the conveyor after a ply 11 has been transferred to it.

Before operating the drive means for the conveyor 55, the position of the ply 11 is checked by means of photo electric cells 40, 41, 42, and 43 mounted in accurately predetermined positions on the shoe 50. As the conveyor feeds the ply towards the former 56 (on which a rubber inner lining is already in place) its leading end 35 actuates the photo electric cell 43 and a rotary encoder driven from the belt surface registers the amount of movement of the belt taking place between actuation of the photo electric cell 43 by the leading end 35 and actuation of the photo electric cell 40 by the trailing end 75. Since these cells are positioned at a known distance apart the length of the ply can be accurately determined from the count registered by the rotary encoder.

A signal is generated by the rotary encoder, having a magnitude proportionate to the length of the ply 11, which is used in a conventional control system to adjust (if necessary) the diameter of the former 56 so that the circumference of the former and the rubber liner carried thereon are matched to the length of the particular ply which is being fed to it. The former 56 may be of the type incorporating radially movable segments under the control of a motor-driven expander mechanism actuated through the control system.

By means of the method and apparatus described above a good joint can be obtained between the ends of the ply when it has been fully transferred to the former. This avoids weaknesses in the tire carcass caused by a gap being formed between the ply ends in the case of a ply which is initially too short, or a localized thickened region in the case where the ply ends would overlap if the ply were too long for the former.

While in the specific example described above the invention is applied to the handling of ply fabric for pneumatic tire carcasses it may also be used for handling other tire building components such as sidewalls, tire treads, or breaker components where these are assembled from strips into annular form at a stage when the former diameter may be adjusted.

A method and apparatus in accordance with the invention may be used at any stage of a tire building process where the circumferential length of a component on a former is subject to subsequent alteration within practical limits : where the circumferential length of the component at a subsequent stage has to be exactly determined, this can usually be done by expanding or contracting the former after the joint has been made.

I claim:

1. A method of manufacturing a new tire comprising the following steps in order:

(i) cutting a strip of tire building material to a predetermined precut length, (ii) conveying the length of strip material towards a tire building former having an uncured carcass mounted thereon said former having a variable circumferential length, (iii) accurately measuring the length of the strip during its conveyance to the former by using two photoelectric cells arranged in accurately predetermined relationship along the direction of conveyance so that as the conveyor feeds the strip towards the former the photoelectric cells are respectively actuated by the leading and trailing ends of the strip, (iv) deriving a signal have a magnitude proportionate to the length of the strip by means of a rotary encoder to register the amount of movement of the conveyor taking place between actuation of the photoelectric cells, (v) utilizing said signal to adjust if necessary, the circumferential length of the former to match the length of the strip to achieve a good joining relationship of the ends of the strip after the strip has been wrapped around the former.

2. Apparatus for the manufacture of a new tire comprising:

(i) a tire building former of variable diameter having a motor driven expander mechanism, (ii) conveyor means for feeding a strip of material to the former, (iii) means for measuring the length of the strip on the conveyor means during its conveyance to the former and which comprises a pair of photoelectric cells arranged in predetermined spaced apart positions along the direction of conveyance and being actuated respectively by the leading and trailing ends of the strip, (iv) a rotary encoder driven by the conveyor to register the amount of movement of the conveyor taking place between actuation of the photoelectric cells to generate a signal having a magnitude proportionate to the length of the strip, and (v) control means responsive to said signal to operate the expander mechanism and alter, if necessary, the circumferential length of the former so as to vary said diameter in response to a length of strip.

3. Apparatus as claimed in claim 2 wherein the conveyor means comprises a belt conveyor having a moveable roller to tighten the belt in lapping relationship with the former.

4. Apparatus as claimed in claim 3 wherein the moveable roller is mounted to be lowered to release the belt from the former.

* * * * *